US012784995B2

(12) United States Patent
Dobai et al.

(10) Patent No.: US 12,784,995 B2
(45) Date of Patent: Nov. 3, 2026

(54) HYBRID POLYMER CAPACITOR

(71) Applicant: TDK Electronics AG, Munich (DE)

(72) Inventors: László Dobai, Szeleste (HU); Giuseppe Scaduto, Rozzano (IT); Henrietta Rauchne Kocsis, Táplánszentkereszt (HU)

(73) Assignee: TDK Electronics AG, Munich (DE)

( * ) Notice: Subject to any disclaimer, the term of this patent is extended or adjusted under 35 U.S.C. 154(b) by 119 days.

(21) Appl. No.: 18/832,804

(22) PCT Filed: Feb. 23, 2023

(86) PCT No.: PCT/EP2023/054528
§ 371 (c)(1),
(2) Date: Jul. 24, 2024

(87) PCT Pub. No.: WO2023/161328
PCT Pub. Date: Aug. 31, 2023

(65) Prior Publication Data

US 2025/0104929 A1 Mar. 27, 2025

(30) Foreign Application Priority Data

Feb. 25, 2022 (DE) ........................ 102022104622.2

(51) Int. Cl.
*H01G 9/035* (2006.01)
*H01G 9/025* (2006.01)
*H01G 9/02* (2006.01)

(52) U.S. Cl.
CPC ............ *H01G 9/035* (2013.01); *H01G 9/025* (2013.01); *H01G 9/02* (2013.01)

(58) Field of Classification Search
None
See application file for complete search history.

(56) References Cited

U.S. PATENT DOCUMENTS 4,481,084 A * 11/1984 Chen .................... H01G 9/0032 205/175
8,345,409 B2 * 1/2013 Dominey ............... H01G 9/045 361/523

(Continued)

FOREIGN PATENT DOCUMENTS

DE 102013204374 A1 9/2013
DE 102017124139 A1 4/2019

(Continued)

OTHER PUBLICATIONS

Translation WO ’793 (Year: 2004).*

(Continued)

*Primary Examiner* — Dion R. Ferguson
(74) *Attorney, Agent, or Firm* — Nixon Peabody LLP

(57) ABSTRACT

A hybrid polymer capacitor includes an anode layer, a cathode layer, a plurality of layers stacked between the anode layer and the cathode layer, and a liquid electrolyte. The plurality of layers includes: (i) a not hydrated metal oxide layer having a thickness of at least 100 nm in a stacking direction, and (ii) a hydrated metal oxide layer arranged on a surface of the not hydrated metal oxide layer. The liquid electrolyte has a conductivity of at least 200 μS/cm at 30° C. and a water content of at least 0.5%. The hydrated metal oxide layer and the not hydrated metal oxide layer are impregnated with the liquid electrolyte.

18 Claims, 4 Drawing Sheets

(56) References Cited

U.S. PATENT DOCUMENTS

| | | | | |
|---|---|---|---|---|
| 8,462,484 | B2 | 6/2013 | Kakuma | |
| 9,959,981 | B2 | 5/2018 | Merker | |
| 10,894,157 | B2 * | 1/2021 | Bowen | A61N 1/0563 |
| 11,049,662 | B2 * | 6/2021 | Dobai | H01G 11/48 |
| 2007/0183120 | A1 | 8/2007 | Fujimoto | |
| 2011/0242734 | A1 | 10/2011 | Dominey | |
| 2013/0242467 | A1 | 9/2013 | Biler | |
| 2018/0280689 | A1 * | 10/2018 | Bowen | H01G 9/0032 |
| 2020/0251286 | A1 * | 8/2020 | Dobai | H01G 9/0036 |
| 2020/0251287 | A1 | 8/2020 | Dobai | |
| 2021/0313117 | A1 | 10/2021 | Bowen | |
| 2025/0104929 | A1 * | 3/2025 | Dobai | H01G 9/055 |

FOREIGN PATENT DOCUMENTS

| | | | | |
|---|---|---|---|---|
| EP | 3109874 | A1 | 12/2016 | |
| EP | 3951814 | A1 | 2/2022 | |
| JP | S61-101017 | A | 5/1986 | |
| JP | 2013-214674 | A | 10/2013 | |
| JP | 2020-528673 | A | 9/2020 | |
| WO | WO-2004079793 | A2 * | 9/2004 | H10D 84/212 |
| WO | WO-2017056730 | A1 * | 4/2017 | H01M 50/489 |
| WO | WO-2022172720 | A1 * | 8/2022 | H01G 9/042 |

OTHER PUBLICATIONS

Translation WO ’730 (Year: 2017).*

Translation WO ’720 (Year: 2022).*

International Search Report and Written Opinion of International Patent Application No. PCT/EP2023/054528, mailed May 10, 2023 (9 pages).

Examination Report in Japanese Patent Application No. 2024-550182, dated Oct. 7, 2025, in Japanese (3 pages).

* cited by examiner

HYBRID POLYMER CAPACITOR

CROSS-REFERENCE TO RELATED APPLICATIONS

This application is a U.S. National Stage of International Application No. PCT/EP2023/054528, filed Feb. 23, 2023, which claims the benefit of Germany Patent Application No. 102022104622.2, filed Feb. 25, 2022, both of which are incorporated herein by reference in their entireties.

FIELD

The present invention concerns a hybrid polymer capacitor.

BACKGROUND

Hybrid polymer capacitors are used in electronic circuits where high capacitance and voltage range, low ESR, enhanced ripple current capability or wide operating temperature ranges are needed in a compact design. The capacitor manufacturers can offer hybrid polymer capacitors in low voltage range. For example, U.S. Pat. Nos. 8,462,484 B2 or 9,959,981 B2 disclose state of art hybrid polymer capacitors. The capacitors are limited to low working voltages. The maximum disclosed breakdown voltage amounts 119 V.

In cases where working voltages of more than 150 V are used, hybrid polymer capacitors are sensitive to short circuits (breakdown) between the anode and the cathode electrodes. Therefore, other capacitor types like film capacitors are used in electronic circuits at working voltages higher than 150 V.

Up to now capacitor manufacturers have not been able to develop and produce high voltage hybrid polymer capacitors because the reliability of these products was not adequate to use in commercial electronic circuits. However, e.g. for electrical vehicle chargers and inverters, capacitors voltage classes of 400 V and higher become relevant.

SUMMARY

The present invention provides an improved hybrid polymer capacitor. The capacitor comprises several layers arranged between an anode layer and a cathode layer.

The anode layer forms the anode electrode of the capacitor and the cathode layer forms the cathode electrode of the capacitor.

Furthermore, a not hydrated metal oxide layer is provided. The not hydrated metal oxide layer, in the following text also designated as oxide layer, has a thickness of at least 100 nm in a stacking direction. Herein, the stacking direction is the direction in which the anode layer and the cathode layer face each other and in which the several layers are stacked. The stacking direction is thus also the direction of an electrical field applied to the capacitor and the direction of current flow in case of capacitor breakdown. Herein, the oxide layer serves as an electrical isolation layer between the anode and the cathode.

In preferable embodiments, the thickness of the not hydrated metal oxide layer may be bigger than 110 nm or bigger than 120 nm.

In a preferred embodiment, the anode comprises an anode foil comprising one or more anode layers and the cathode comprises a cathode foil comprising one or more cathode layers. Both, the anode and the cathode may comprise a metal, preferably aluminum. Aluminum has favorable electro-chemical properties, suitable for application in a capacitor.

The anode and the cathode layer may further provide a porous structure with an advantageously large surface. The pores may be actively etched in the anode or cathode material. In particular, the cathode layer surface may comprise roughened or sponge-like or grape-like structures for surface area enhancement.

The capacitor comprises further a liquid electrolyte which has a conductivity of at least 200 μS/cm measured at 30° C. and a water content of at least 0.5% (in relation to the electrolyte, percent is defined as w/w %, weight of water/total weight of electrolyte). The conductivity of the liquid electrolyte may be significantly higher than 200 μS/cm. In particular, the conductivity may amount up to 2500 μS/cm at 30° C. A surface of the oxide layer is impregnated with the liquid electrolyte.

A minimum thickness of the oxide layer, which is electrically isolating, is essential to provide for a certain breakdown voltage of the capacitor. The breakdown voltage is determined by experiment as follows. To determine the breakdown voltage, the capacitor is provided with a series resistor of 1000 Ω and subjected to an increasing voltage starting from 0 V, with voltage steps of 1 V/s. The occurring electrical current is measured. The voltage value at which the current occurring rises to more than 500 μA is specified as the breakdown voltage.

The oxide layer may comprise discrete voids with diameters in nanometer range. Such voids may be distributed in a high density over the whole oxide layer. An increasing thickness of the oxide layer may result in a higher number of voids. Also the density of the voids may increase. During operation, the discrete voids may condense into larger void structures which may reach the surface of the oxide layer.

Thus, conductive substances, like e.g. polymer nanoparticles which may be provided at the surface of the oxide layer, may penetrate into the voids forming conductive paths through the oxide layer and thereby cause a lowering of the breakdown voltage of the capacitor.

The specified liquid electrolyte with a conductivity of at least 200 μS/cm measured at 30° C. and a water content of at least 0.5% is suitable to reform the oxide layer during operation of the capacitor by its oxidation abilities. Therefore, a formation of unwanted void structures, which may undermine the electrical isolation properties of the oxide layer and lower the breakdown voltage, is at least inhibited or even avoided.

The liquid electrolyte is impregnated onto the layers of the capacitor and in particular on the surfaces of the oxide layer. The electrolyte has the ability to oxidize the anode metal to reform the oxide layer and to avoid or close unwanted void structures in the oxide layer. The water content of the electrolyte is preferably between 0.5% and 7% or between 0.5% and 5%, more preferably between 0.5% and 3%. Effective re-oxidation is improved by the optimized water content of the liquid electrolyte as specified above.

Thus, the capacitor can withstand a voltage of more than 150 V, preferably more than 250 V and more preferably at least up to 400 V or 450 V.

Further, a sparking voltage, at which the liquid electrolyte starts to form a thicker oxide layer is preferably higher than 400 V at 85° C.

The sparking voltage is a feature of the electrolyte measured in a beaker in excess of the electrolyte, without a separator layer but only with a defined distance between anode and cathode foil. The breakdown voltage is higher than the sparking voltage because the separator layer of the capacitor limits the total amount of electrolyte and limits movement of the ions in the electrolyte.

Due to smaller sized components for the same capacitance and due to their excellent heat dissipation ability leading to more economical and more compact heat-sink and cooling unit designs, hybrid polymer capacitors are cheaper with respect to film capacitors. The hybrid polymer capacitor according to the invention can substitute film capacitors at working voltages over 150 V.

Furthermore, hybrid polymer capacitors allow enhanced reliability due to their described self-recovery-properties.

In a preferred embodiment, the anode layer comprises aluminum and the oxide layer comprises aluminum oxide $Al_2O_3$, also designated as alumina. Preferably, the layers consist of these materials.

Aluminum has favorable electro-chemical properties. Further, alumina is a well-known good electrical isolator, suitable for application in a capacitor.

In an embodiment, the oxide layer is applied directly on a surface of the anode layer.

In the stacking direction, the oxide layer and the anode layer are adjacent to each other. The oxide layer may comprise oxidized anode material. In particular, the oxide layer may be formed in a manufacturing process by oxidizing the anode layer by a strong forming electrolyte like e.g. water based dicarboxylic acids or borate type solutions, different form the liquid electrolyte which is used during operation of the capacitor.

Further, the several layers of the capacitor comprise a hydrated metal oxide layer arranged on a surface of the not hydrated metal oxide layer. The not hydrated metal oxide layer is arranged on the surface of the oxide layer which faces away from the anode in the stacking direction. The hydrated metal oxide layer may have a thickness of at least 10 nm in the stacking direction.

The hydrated oxide layer serves as a protection layer for the not hydrated oxide layer. The not hydrated oxide layer is formed by the application of a solution of an oxidizing electrolyte in water during a manufacturing process. The hydrated oxide layer may be formed by a specific hydration processes, e.g. boiling, with adequate forming salts as pretreatment and a special temperature profile treatment during an annealing step of the anode foil.

In particular, the hydrated oxide layer at least partially prevents a penetration of conductive polymer nanoparticles into a bulk of the oxide layer and thus prevents sparking phenomena and enhances the breakdown voltage. In combination with the oxidation ability of the liquid electrolyte, the hydrated oxide layer thus prevent electrical short-cuts through the oxide layer.

The hydrated oxide layer is less dense but more homogeneous than the not hydrated oxide layer. Accordingly, a preferable thickness of the hydrated oxide layer is at least 10 nm.

In particular, the hydrated oxide layer may comprise hydrated alumina, which is hydrated $Al_2O_3$, i.e. $Al_2O_3 \cdot xH_2O$ where x is between 0.1 and 3.0 (limits included).

In an embodiment, the not hydrated, the hydrated or both oxide layers are doped by phosphorus. For this, e.g. phosphate anions $PO_4^{3-}$ are added in a forming solution of the oxide layers. The minimum atomic percentage of phosphorus in the oxide layers is preferably at least 0.01%. The anions are added for stabilization of the layer structure to avoid the creation of unwanted void structures and thus improve the breakdown properties of the capacitor.

In an embodiment, the not hydrated oxide layer, which is preferably an alumina layer, comprises a stack of an amorphous and a crystalline oxide layer, in particular an amorphous and a crystalline alumina layer.

In a preferred embodiment, the oxide layer comprises an amorphous $Al_2O_3$ layer and a crystalline $\gamma$-$Al_2O_3$ layer, with a layer thickness ratio of crystalline layer thickness/amorphous layer thickness>0.1. The amorphous layer may be applied directly on the surface of the anode layer. The crystalline layer may be applied directly on the opposite surface of the amorphous layer. Since the amorphous layer shows less structural defects and has therefore better sealing properties than the crystalline layer but the crystalline layer can be applied with a larger thickness, the breakdown voltage of the capacitor may be increased by a combination of both layers.

In an embodiment, a rated voltage of the capacitor is larger than 150 V and preferably larger than 250 V. More preferably, the rated voltage of the capacitor is at least 400 V or 450 V.

Therefore, the present invention allows the usage of hybrid polymer capacitors at extended rated voltages higher than 150 V. Compared with other capacitor types, hybrid polymer capacitors enable an excellent capacitance/volume ratio, low ESR (equivalent series resistance) at high frequencies and also low ESR at low temperatures.

Miniaturization and cost saving requirements can be accomplished by using hybrid polymer capacitors due to their small component size and due to their excellent heat dissipation ability leading to more economical and more compact heat-sink and cooling unit designs. Therefore, for the same capacitance, hybrid polymer capacitors are smaller and cheaper than e.g. film capacitors.

In an embodiment, a polymer layer comprising a conductive polymer is arranged between the one or more oxide layers, which are the not hydrated and the optional hydrated oxide layer, on its one side and the cathode layer on its opposite side.

The polymer effectively works as a layer of the cathode of the capacitor.

The polymer is preferably applied by impregnation of the capacitor layers with a dispersion of the electrical conductive polymer. Thereby, nanoparticles of the conductive polymer are applied on an outer surface of the oxide layers, which does not face the anode or another oxide layer. The applied nanoparticles gather and form the polymer layer.

Besides, polymer nanoparticles may penetrate into the hydrated and non-hydrated oxide layer and other adjacent layers like a separator layer or the cathode layer, thereby enhancing the electrical conductibility of these layers.

The polymer layer comprises preferably a PEDOT:PSS polymer material, which means poly(3,4-ethylenedioxythiophene) polystyrene sulfonate, which is a polymer mixture of two ionomers (PEDOT and PSS). This material shows favorable properties for usage as a conductive polymer in a capacitor.

The nature of the hybrid polymer material PEDOT:PSS leads to favorable low ESR levels of the capacitor even at low temperatures.

Preferably, a separator layer configured with a separator withstand factor of at least 5% is arranged between the polymer layer and the cathode layer. More preferably, the withstand factor is at least 15%.

The separator layer is interposed between the anode layer and the cathode layer to avoid direct contact between the electrodes.

Breakdown phenomena of the capacitor depend on the rated voltage of the capacitor as well as on the characteristics of the isolating oxide layer and of the separator.

The characteristics of the separator layer are at least its material type, density and thickness. The aforementioned characteristics are more specifically determined by the separator withstand factor, which determines the breakdown voltage.

The separator may be impregnated with the liquid electrolyte to fill up all pores in the separator which could not be reached by polymer nanoparticles during polymer impregnation.

Furthermore, after impregnation, the electrolyte fills up pores in the anode and cathode foil. Thus, the capacitance of the capacitor can be maximized since no or only a minimum of void spaces is left over in the electrodes.

In an embodiment, the separator layer has a minimum thickness of 50 μm.

In an embodiment, the density of the separator layer is at least 0.30 g/cm$^3$.

The both before mentioned characteristics of the separator layer enhance the withstand factor of the separator layer and thus the breakdown voltage of the capacitor.

Herein, the withstand factor is defined as follows: basic weight of the separator/rated voltage of the capacitor.

The basic weight of the separator is defined as density× thickness of the separator in g/m$^2$.

In an embodiment, the separator layer comprises a material of natural and/or artificial fibers, arranged in single or multiple layers. Preferably, wherein an average mass per area ratio of the separator layer is higher than 8.0 g/m$^2$.

In an embodiment, the separator layer comprises a filter membrane layer, wherein a filter membrane material may comprise PET, Nylon, PTFE (polytetrafluor ethylene) and/or PES (polyether sulfone). The filter membrane may comprise pores with pore diameters higher than 0.22 μm. In case of very large pore sizes, where the membrane becomes fragile, the separator may comprise an additional support layer.

The pores allow and impregnation of the separator layer with the conductive polymer and the liquid electrolyte.

In an embodiment, an intermediate electrolyte layer is arranged between the polymer layer and the separator layer. The intermediate electrolyte layer may be provided to enhance the breakdown voltage.

The intermediate electrolyte layer comprises an intermediate electrolyte. The intermediate electrolyte may be a conductive, viscous material which is arranged between the polymer layer and the separator layer. The intermediate electrolyte may abut the polymer layer. The intermediate electrolyte may abut the separator layer. The intermediate electrolyte may be different from the liquid electrolyte described before with respect to its composition.

The intermediate electrolyte may prevent that too much of the liquid electrolyte gets in contact with the polymer layer, thereby the intermediate electrolyte may prevent the liquid electrolyte from damaging, degrading or swelling the polymer layer. As the intermediate electrolyte is arranged between the liquid electrolyte and the polymer layer, more aggressive materials can be used for the liquid electrolyte with better oxidation abilities. Accordingly, the use of the intermediate electrolyte may enable the use of materials for the liquid electrolyte other than GBL (γ-butyrolactone) and sulfolane solvents. Thus, the construction of a capacitor is enabled which can withstand higher voltages.

The liquid electrolyte may also be a conductive, viscous material. A voltage may be applied to the liquid electrolyte via the cathode foil. The liquid electrolyte may act as a second electrode of the capacitor.

The liquid electrolyte and the intermediate electrolyte may differ in their composition. For example, the liquid electrolyte may comprise ethylene glycol and the intermediate electrolyte may be free from ethylene glycol. In this case, the intermediate electrolyte being free from ethylene glycol may ensure that the polymer is not damaged by ethylene glycol. At the same time, the liquid electrolyte comprising ethylene glycol may ensure that the advantageous properties of ethylene glycol can be exploited.

The intermediate electrolyte may comprise polyol and a conducting salt. The conducting salt may ensure that the intermediate electrolyte is conductive.

In further embodiments, one or more of a carbon layer, a titanium layer, a titanium oxide layer and a silicon dioxide layer are arranged between the cathode layer and the separator layer. Further, the cathode foil may be oxidized. Accordingly, the cathode foil may have an artificially formed cathode oxide layer. The cathode oxide layer may be thicker than a natural oxide having a thickness of 2 nm to 3 nm. These layers protect the cathode metal material and allow further enhancement of the breakdown voltage since they provide additional withstand.

In an embodiment, the several layers between the anode layer and the cathode layer are stacked in an order as mentioned.

In particular, the several layers may be stacked in the following order. Optional layers may be omitted. The layer order may be as follows: anode layer, (not hydrated) oxide layer, hydrated oxide layer, polymer layer, intermediate electrolyte layer, separator layer, and the cathode layers. The layers may abut to their neighboring layers in the order as described above. Again, optional layers may be omitted.

In different embodiments, the hybrid polymer capacitor may be either a capacitor of a flat stack type or of a wounded type.

BRIEF DESCRIPTION OF THE DRAWINGS

In the following, the invention will be explained in more detail with reference to accompanied figures. The invention is not restricted to the combination of features or elements shown in the figures and embodiments.

Similar or apparently identical elements in the figures are marked with the same reference signs. The figures and the proportions in the figures are not scalable.

The figures show:

Figure 1:
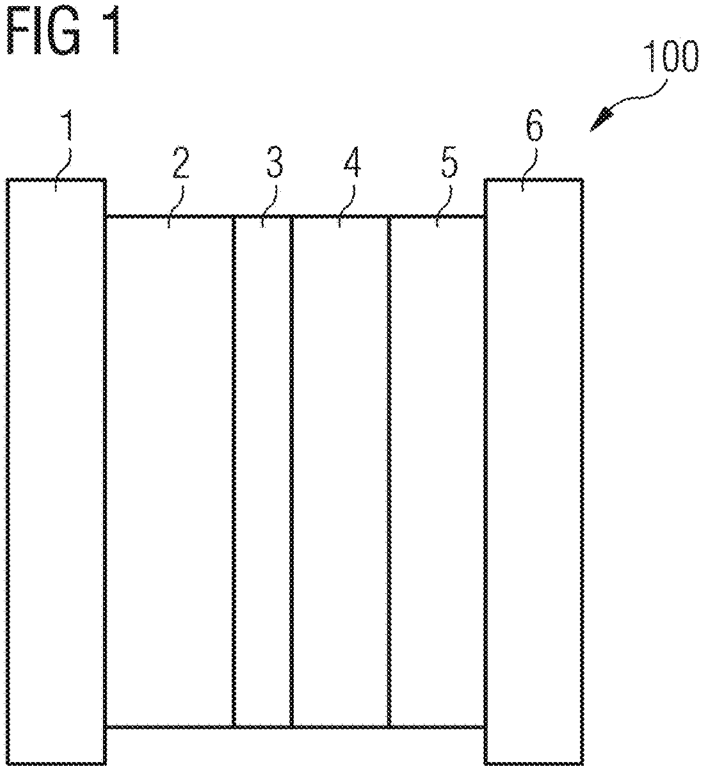
Figure 2:
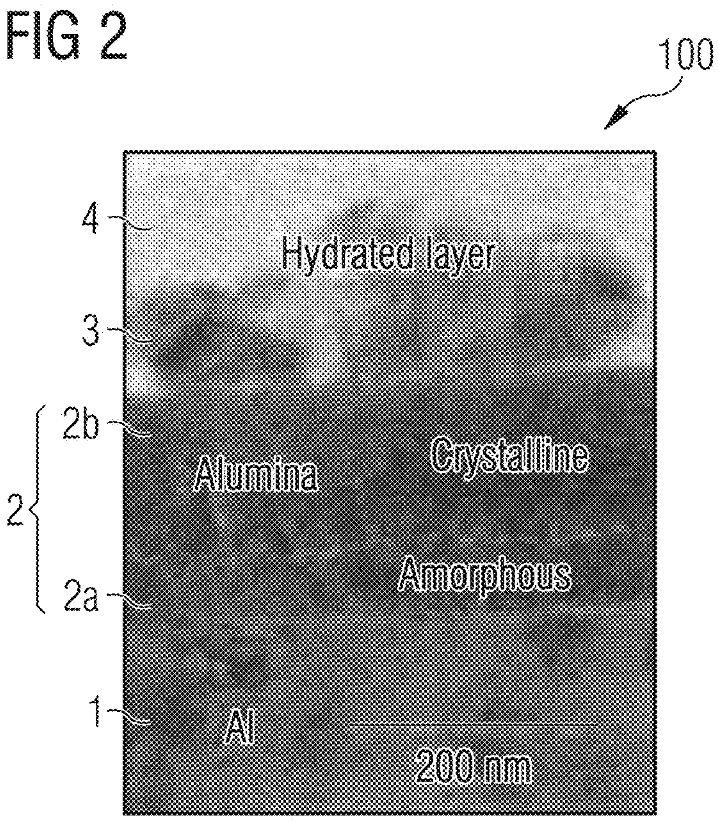

FIG. 1: schematic view of a first embodiment of a hybrid polymer capacitor according to the invention, FIG. 2: TEM partial cross-sectional view of an anode foil with applied layers, FIG. 3: exemplary test film for measuring polymer film resistance, FIG. 4: schematic view of a second embodiment of the hybrid polymer capacitor including a viscous electrolyte layer, FIG. 5: schematic view of a third embodiment of the hybrid polymer capacitor including a carbon layer, FIG. 6: schematic view of a third embodiment of the hybrid polymer capacitor including a titanium layer and a silicon dioxide layer.

DETAILED DESCRIPTION

FIG. 1 shows a first embodiment of a hybrid polymer capacitor 100 according to the invention.

The overall capacitor 100 geometry may be designed as a wounded capacitor 100 or a flat stack type capacitor 100. Different types of capacitor 100 housings of both geometries are possible.

The hybrid polymer capacitor 100 comprises a stack of several layers.

The capacitor 100 is incorporated in an electrical circuit, comprising at least two electrodes, an anode and a cathode, connected to tabs or terminals for external electrical contact. In particular, anode and cathode electrodes are electrically connected to external positive and negative pins by using lead tabs. The capacitor may be integrated in an electrical circuit, e.g. as an electrical filter or as a storage component.

The anode comprises in the shown embodiment a metallic anode foil 1. The foil comprises preferably one anode layer 1 made of aluminum.

The anode foil 1 in the present example is porous in order to increase a surface of the layer.

On the surface of the anode foil 1 an oxide layer 2 is applied. The oxide layer 2 comprises an oxidized anode metal material. In particular, the oxide layer 2 is applied by anodic oxidation of the anode metal material. In the present embodiment, the oxide layer 2 comprises oxidized aluminum, in particular alumina ($Al_2O_3$).

The oxide layer 2 has a thickness of preferably 100 nm or more. This minimum thickness of the oxide layer 2 is necessary to provide a required minimum allowable breakdown voltage of the capacitor 100.

In the example, the oxide layer 2 comprises several layers. The oxide layer 2 comprises an amorphous $Al_2O_3$ layer **2*a* and a crystalline $\gamma$-$Al_2O_3$ layer 2*b*, with a layer thickness ratio of crystalline layer thickness/amorphous layer thickness>0.1. The amorphous layer 2*a* is applied directly on the surface of the anode foil 1. The crystalline layer 2*b* is applied directly on the opposite side of the amorphous layer 2*a***.

The two layers **2*a* and 2*b* are also shown in FIG. 2. FIG. 2 represents a TEM (transmission electron microscopy) partial cross-sectional view of the anode foil 1 with the applied layers 2*a* and 2*b***.

An initial electrical leakage current at the anode electrode is low and stable during operation of the capacitor 100. However, the oxide layer 2 comprises discrete voids with diameters in nanometer range, which are distributed in a high density over the oxide layer 2. During operation, the discrete voids may condense into larger void structures, may reach the surface of the oxide layer 2 and may interact with conductive polymer nanoparticles on the surface of the oxide layer 2 causing a lowering of the breakdown voltage of the capacitor 100.

Therefore, the oxide layer stability may be enhanced by a sequence of chemical or thermal relaxation and reformation processes during manufacturing, which additionally lower the initial leakage current during operation of the capacitor 100.

On the surface of the oxide layer 2 opposite to the anode foil 1, a hydrated oxide layer 3 is applied. The hydrated oxide layer 3 comprises a hydrated oxidized anode metal material.

In the present embodiment, the hydrated oxide layer 3 comprises hydrated alumina, which is hydrated $Al_2O_3$, i.e. $Al_2O_3 \cdot xH_2O$ where x is selected form the range 0.1 to 3.0.

The preferable minimum thickness of the oxide layer 2 is 10 nm. The oxide layer 2 and the hydrated oxide layer 3 are formed by the application of a solution of a strongly oxidizing electrolyte in water during a manufacturing process of the capacitor 100.

The hydrated oxide layer 3 protects the oxide layer 2 as follows:

First, the hydrated oxide layer 3 is an additional electrical isolating layer to increase the breakdown voltage.

Second, the oxide layer 2 includes natural cracks and voids on a surface of the layer generated e.g. by mechanical or thermal stress. The hydrated oxide layer 3 is a less dense but more homogeneous layer, which prevents e.g. conductive polymer nanoparticles from penetrating into a bulk of the oxide layer 2.

Thus, the hydrated oxide layer 3 prevents sparking phenomena in the oxide layer 2 due to extremely high conductivity.

Accordingly, a sufficient thickness greater than 10 nm of the hydrated oxide is required.

The oxide layer 2 and the hydrated oxide layer 3 are preferably doped with phosphorus inclusions with an atomic percentage of at least 0.01% for stabilization of their structure and to avoid void formation processes.

A polymer layer 4 is deposited on the surface of the hydrated oxide layer 3, opposite to the oxide layer 2 and the anode foil 1. The polymer layer 4 is conductive and contains a conductive polymer, preferably PEDOT:PSS, which means poly(3,4-ethylenedioxythiophene) polystyrene sulfonate, which is a polymer mixture of two ionomers (PEDOT and PSS).

The polymer is applied by impregnation with a dispersion of the electrical conductive polymer. Thereby, nanoparticles of the conductive polymer may penetrate into adjacent layers like the separator layer 5 and the cathode foil 6, enhancing the electrical conductibility of these layers. On the other hand, the hydrated oxide layer 3 prevents the conductive polymer nanoparticles from penetrating in the not hydrated oxide layer 2.

The polymer of the polymer layer 4 is homogeneously distributed to improve electrical performances of the capacitor 100 like the capacitance, ESR etc.

A liquid working electrolyte of the capacitor 100 can penetrate into the polymer film and the oxide layer 2 to repair oxide defects due to its high oxidation ability with respect to the anode metal.

A conductivity of the polymer layer 4 cannot be measured directly. However, a film resistance is reverse to the conductivity. The film resistance is the electrical resistance of a layer with a specific thickness of polymer in a defined distance. The film resistance may be measured experimentally by applying electrical current via provisional electrodes to a polymer test film 200.

Figure 3:
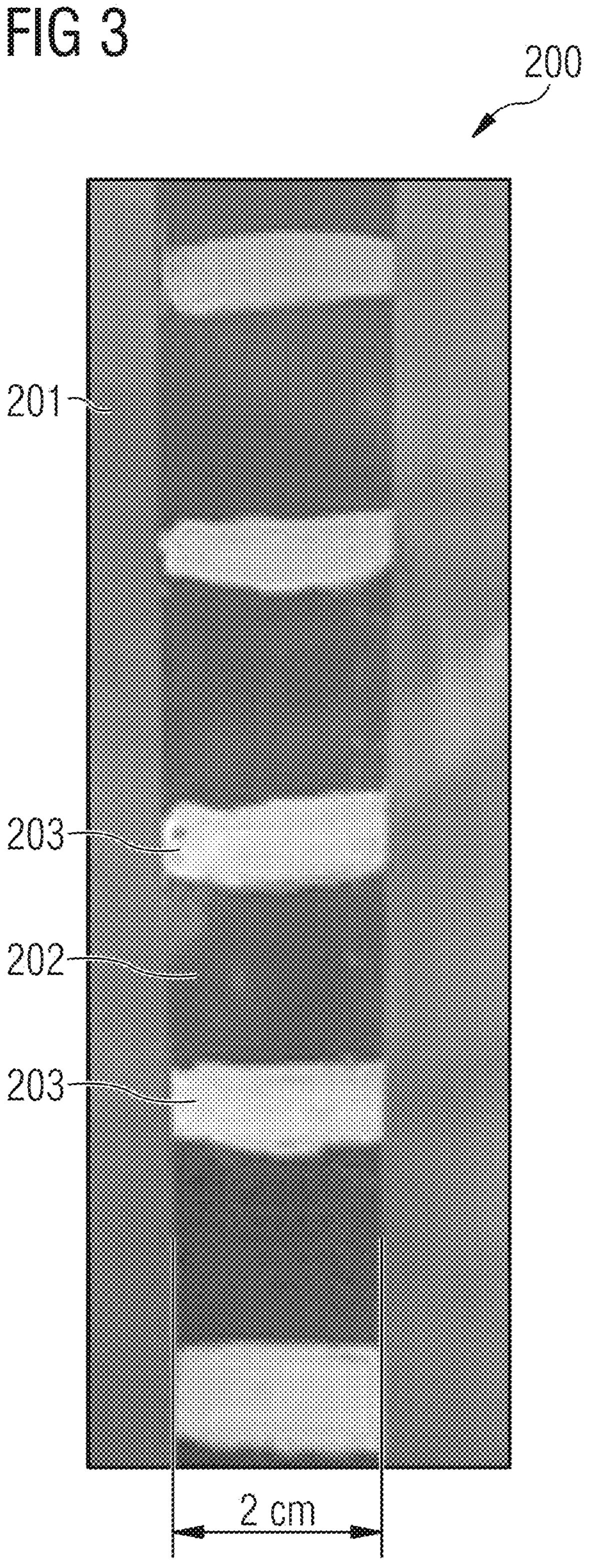

FIG. 3 shows an exemplary test film 200. An 11.5 cm×21.5 cm piece of MYLAR foil 201 was cut and attached to a sample holder. 2 ml of viscous polymer sample were applied onto the foil. The polymer sample was dispersed smoothly with a hand coater forming a polymer film 202.

Afterwards, the polymer film 202 was dried at 180° C. for 60 minutes in an oven. Several silver electrodes 203 were applied on the polymer film 202 and dried at 130° C. for 20 min in an oven. The electrodes 203 should be at least 2 cm long and have 2 cm distance from each other.

As shown in FIG. 1, a separator layer 5 is deposited on the surface of the polymer layer 4, opposite to the oxide layer 2 and the anode foil 1.

The separator layer 5 is interposed between the anode and cathode to avoid direct contact between the electrodes.

Breakdown phenomena of the capacitor 100 depend also on the characteristics of the separator like material type, density, and thickness. The aforementioned characteristics are more specifically determined by a separator withstand factor, which determines the breakdown voltage. The separator is impregnated with the liquid electrolyte to fill up all pores in the separator which could not be reached by polymer nanoparticles during impregnation. Thus, the capacitance of the capacitor 100 can be maximized.

The separator layer 5 comprises a material of natural and/or artificial fibers, arranged in single or multiple layers, wherein an average mass per area ratio shall be higher than 8.0 $g/m^2$.

The separator comprises in this embodiment a filter membrane layer, wherein a filter membrane material may comprise PET, Nylon, PTFE (polytetrafluor ethylene) and/or PES (polyether sulfone). The filter membrane comprise pores with pore diameters higher than 0.22 μm. In further embodiments, the separator may comprise an additional support layer to support the porous and fragile membrane.

The separator may have a minimum thickness of 50 μm and a minimum density of 0.30 $g/cm^3$ to allow the application of voltages higher than 200 V. The resulting withstand factor shall be higher than 5% and preferably higher than 15%.

On the side of the separator layer 5 opposite to the polymer layer 4, a metallic cathode foil 6 comprising a cathode layer 6 is arranged forming the cathode of the capacitor 100. The surface of the cathode foil 6 is roughened in a sponge-like or grape-like structure and the external surface and may be stabilized by a chemical phosphate treatment and/or by a thermal or electrochemical oxidation treatment.

The liquid electrolyte is impregnated onto the separator as well as on the surfaces of the anode and the cathode. The liquid electrolyte has the ability to oxidize the anode metal, in particular aluminum. The conductivity of the liquid electrolyte at 30° C. shall be at least 200 μS/cm. The water content of the electrolyte shall be between 0.5% and 5% preferably between 0.5% and 3% (weight percent).

The electrolyte can reform the oxide layer 2 which can thus withstand more than 150 V, preferably more than 250 V and more preferably at least up to 400 V.

During the lifetime of the capacitor 100, defects can be created at the surface of the oxide layer 2. Therefore, a low conductive electrolyte is used to repair the defects at the surface of the oxide layer 2 by oxidation of anode metal. The high oxidation ability of the electrolyte relates to the elevated sparking voltage.

In addition, an effective oxidation ability is improved by the optimized water content of the electrolyte, which is a liquid electrolyte.

The liquid electrolyte has the additional advantage to fill up the pores in all layers, thus maximizing the capacitance which might otherwise be reduced by an incomplete contact between the polymer layer 4 and the hydrated or not hydrated oxide layer 2 and 3. Such an incomplete contact may result in a capacitance drop during the capacitor lifetime.

The breakdown voltage of the whole capacitor 100 strongly depends on the total conductivity between the anode foil 1 and the cathode foil 6.

Furthermore, the breakdown voltage depends also on the quality of the oxide layer 2 applied on the anode foil 1. In particular, the stability of the surface of the oxide layer 2 plays a significant role. The quality of the oxide layer 2 is affected by the content of phosphorus inclusions, which stabilize the oxide layer 2 against hydration and sparking phenomena during lifetime of the capacitor 100.

Figure 4:
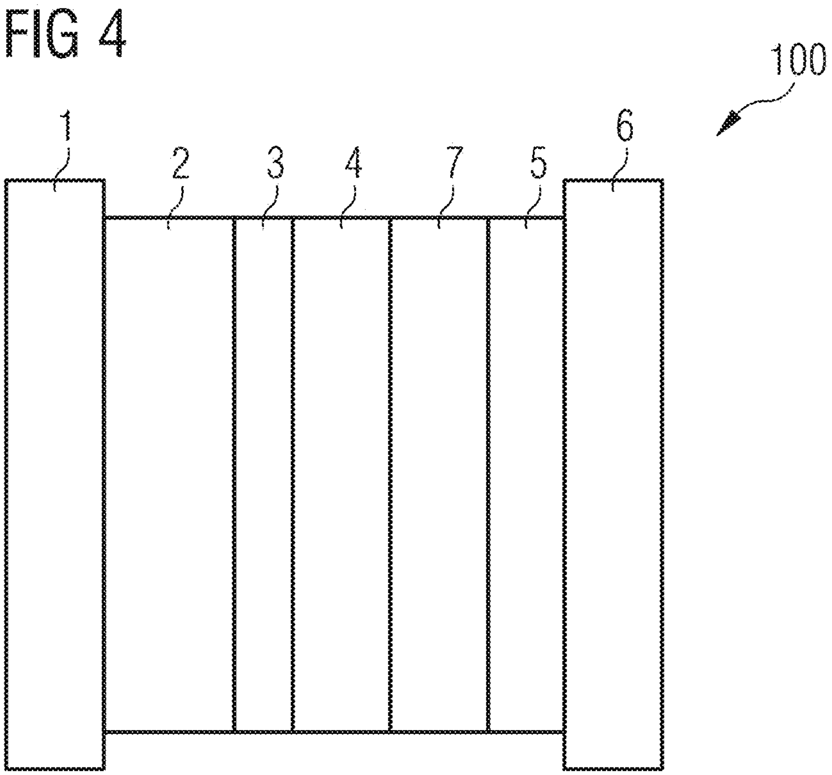

In an alternative embodiment shown in FIG. 4, the capacitor 100 is created with an additional viscous electrolyte layer 7 between separator 5 and polymer layer 4 to enhance the breakdown voltage.

Figure 5:
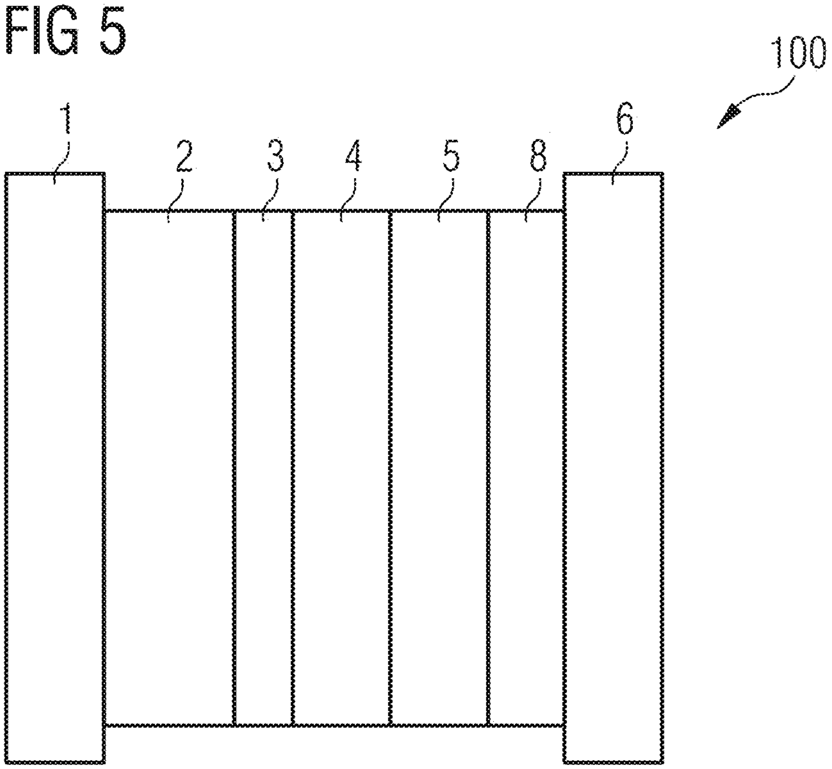
Figure 6:
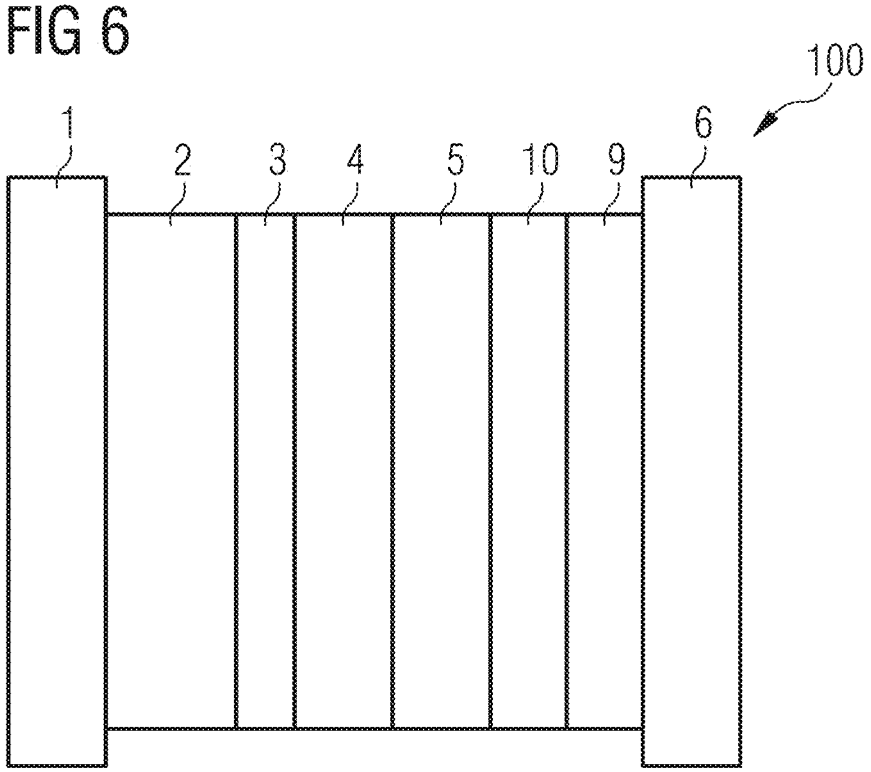

In further embodiments, shown in the FIGS. 5 and 6, additional layers are arranged between cathode foil 6 and separator layer 5.

In FIG. 5 a carbon layer 8 is applied on the surface of the cathode foil 6.

In FIG. 6 a titanium layer 9, or alternatively a titanium oxide layer 2, and a silicon dioxide layer 10 are arranged between the cathode foil 6 and the separator layer 5. These layers 9 and 10 allow a further enhancement of the breakdown voltage.

REFERENCE SIGNS

1 anode foil/layer
2 oxide layer
2*a* amorphous oxide layer
2*b* crystalline oxide layer
3 hydrated oxide layer
4 polymer layer
5 separator layer
6 cathode foil
7 electrolyte layer
8 carbon layer
9 titanium layer
10 silicon dioxide layer
100 capacitor
200 test film
201 MYLAR foil
202 polymer film
203 test electrodes

The invention claimed is:

1. A hybrid polymer capacitor comprising:
an anode layer;
a cathode layer;
a plurality of layers stacked between the anode layer and the cathode layer, the plurality of layers including:
a not hydrated metal oxide layer having a thickness of at least 100 nm in a stacking direction, and
a hydrated metal oxide layer arranged on a surface of the not hydrated metal oxide layer; and
a liquid electrolyte having a conductivity of at least 200 μS/cm at 30° C. and a water content of at least 0.5%, wherein the hydrated metal oxide layer is impregnated with the liquid electrolyte, and wherein the not hydrated metal oxide layer comprises a stack of an amorphous metal oxide layer and a crystalline metal oxide layer.

2. The hybrid polymer capacitor according to claim 1, wherein the not hydrated metal oxide layer is applied directly on a surface of the anode layer.

3. The hybrid polymer capacitor according to claim 1, wherein the hydrated metal oxide layer has a thickness of at least 10 nm in the stacking direction.

4. The hybrid polymer capacitor according to claim 1, wherein the hydrated metal oxide layer and/or the not hydrated metal oxide layer is an aluminum oxide layer.

5. The hybrid polymer capacitor according to claim 1, wherein the hydrated metal oxide layer and/or the not hydrated metal oxide layer is doped by phosphate anions.

6. The hybrid polymer capacitor according to claim 1, wherein a nominal voltage of the capacitor is larger than (i) 150 V or (ii) 250 V.

7. The hybrid polymer capacitor according to claim 1, wherein the plurality of layers further includes a polymer layer comprising a conductive polymer, wherein the polymer layer is arranged between (i) the not hydrated metal oxide layer and the cathode layer and/or (ii) the hydrated metal oxide layer and the cathode layer.

8. The hybrid polymer capacitor according to claim 7, wherein the conductive polymer comprises a PEDOT:PSS polymer material.

9. The hybrid polymer capacitor according to claim 7, wherein the plurality of layers further include a separator layer, the separator layer arranged between the polymer layer and the cathode layer, the separator layer being configured with a separator withstand factor of at least 5%.

10. The hybrid polymer capacitor according to claim 9, wherein the separator withstand factor is at least 15%.

11. The hybrid polymer capacitor according to claim 9, wherein the separator layer has a minimum thickness of 50 μm.

12. The hybrid polymer capacitor according to claim 9, wherein a density of the separator layer is at least 0.30 $g/cm^3$.

13. The hybrid polymer capacitor according to claim 9, wherein an average mass per area ratio of the separator layer is higher than 8.0 $g/m^2$.

14. The hybrid polymer capacitor according to claim 9, wherein the plurality of layers further include an intermediate electrolyte layer, the intermediate electrolyte layer being arranged between the polymer layer and the separator layer.

15. The hybrid polymer capacitor according to claim 9, wherein a carbon layer, a titanium layer, a titanium oxide layer, and/or a silicon dioxide layer are arranged between the cathode layer and the separator layer.

16. The hybrid polymer capacitor according to claim 1, wherein the plurality of layers between the anode layer and the cathode layer are stacked in an order as mentioned.

17. The hybrid polymer capacitor according to claim 1, wherein the hybrid polymer capacitor is a flat stack type capacitor or a wounded type capacitor.

18. The hybrid polymer capacitor according to claim 1, wherein the water content of the liquid electrolyte is between 0.5% and 7%.

* * * * *